US011352525B2

(12) United States Patent
Nagai et al.

(10) Patent No.: US 11,352,525 B2
(45) Date of Patent: Jun. 7, 2022

(54) POLYOLEFIN RESIN FOAMED SHEET AND ADHESIVE TAPE

(71) Applicant: SEKISUI CHEMICAL CO., LTD., Osaka (JP)

(72) Inventors: Kento Nagai, Shiraoka (JP); Koji Yachi, Shiraoka (JP); Asami Nagai, Shiraoka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 15/763,148

(22) PCT Filed: Sep. 29, 2016

(86) PCT No.: PCT/JP2016/078913
§ 371 (c)(1),
(2) Date: Mar. 26, 2018

(87) PCT Pub. No.: WO2017/057628
PCT Pub. Date: Apr. 6, 2017

(65) Prior Publication Data
US 2018/0265743 A1  Sep. 20, 2018

(30) Foreign Application Priority Data

Sep. 29, 2015 (JP) .............................. JP2015-191522
Sep. 29, 2015 (JP) .............................. JP2015-191524

(51) Int. Cl.
*C09J 7/26* (2018.01)
*C08J 9/00* (2006.01)
*C08J 9/36* (2006.01)
*C09J 7/38* (2018.01)
*C08J 9/10* (2006.01)

(52) U.S. Cl.
CPC .............. *C09J 7/26* (2018.01); *C08J 9/0023* (2013.01); *C08J 9/0061* (2013.01); *C08J 9/0066* (2013.01); *C08J 9/0095* (2013.01); *C08J 9/103* (2013.01); *C08J 9/365* (2013.01); *C09J 7/38* (2018.01); *C08J 2201/026* (2013.01); *C08J 2201/03* (2013.01); *C08J 2203/04* (2013.01); *C08J 2205/04* (2013.01); *C08J 2205/052* (2013.01); *C08J 2207/00* (2013.01); *C08J 2323/06* (2013.01); *C08J 2331/04* (2013.01); *C08J 2423/08* (2013.01); *C09J 2423/046* (2013.01)

(58) Field of Classification Search
CPC ...... C08J 9/0023; C08J 9/0061; C08J 9/0066; C08J 9/0095; C08J 9/103; C08J 9/365; C08J 2201/026; C08J 2201/03; C08J 2203/04; C08J 2205/04; C08J 2205/052; C08J 2207/00; C08J 2323/06; C08J 2331/04; C08J 2423/08; C09J 7/26; C09J 7/38; C09J 2423/046
See application file for complete search history.

(56) References Cited

U.S. PATENT DOCUMENTS

| | | | | |
|---|---|---|---|---|
| 3,470,119 A | * | 9/1969 | Adams ....................... | C08J 9/10 264/54 |
| 4,186,068 A | * | 1/1980 | Rubens ...................... | C08J 9/10 521/50.5 |
| 5,929,129 A | * | 7/1999 | Feichtinger ............. | C08L 23/04 521/134 |
| 2006/0234033 A1 | | 10/2006 | Nishikawa et al. | |
| 2008/0003421 A1 | * | 1/2008 | Matsumura ......... | B29C 44/5627 428/219 |
| 2009/0145627 A1 | * | 6/2009 | Frigerio ............... | H01B 13/142 174/110 PM |
| 2010/0249258 A1 | | 9/2010 | Uno et al. | |
| 2014/0356615 A1 | | 12/2014 | Komatsuzaki et al. | |
| 2015/0132558 A1 | | 5/2015 | Iwasaki et al. | |
| 2017/0292002 A1 | * | 10/2017 | Matsuki ................... | B32B 5/18 |

FOREIGN PATENT DOCUMENTS

| | | |
|---|---|---|
| CN | 104053734 | 9/2014 |
| CN | 104650757 | 5/2015 |
| EP | 2 799 472 | 11/2014 |
| JP | 3-143932 | 6/1991 |
| JP | 3-169622 | 7/1991 |
| JP | 5-247247 | 9/1993 |
| JP | 1993247247 | * 9/1993 |
| JP | 2000-273232 | 10/2000 |
| JP | 2005-133091 | 5/2005 |
| JP | 2009-84474 | 4/2009 |
| JP | 2009241431 | * 10/2009 |
| JP | 2009/044690 | 2/2011 |
| JP | 2012-214626 | 11/2012 |
| JP | 2013-213104 | 10/2013 |
| JP | 2014-28925 | 2/2014 |

(Continued)

OTHER PUBLICATIONS

English translation of JP1993-247247 from JPlatPat (Year: 1993).*
English translation of KR10-1012743 from Espacenet (Year: 2011).*
English translation of JP 2009-241431 from JPlatPat (Year: 2009).*
Extended European Search Report dated Mar. 26, 2019 in corresponding European patent application No. 16851799.3.
International Search Report dated Dec. 20, 2016 in International Application No. PCT/JP2016/078913.

(Continued)

*Primary Examiner* — Frank J Vineis
*Assistant Examiner* — Laura B Figg
(74) *Attorney, Agent, or Firm* — Wenderoth, Lind & Ponack, L.L.P.

(57) ABSTRACT

The polyolefin resin foam sheet is a polyolefin resin foam sheet having a plurality of cells in an inside thereof, wherein the 50% compressive strength is 120 kPa or less; the MD elongation percentage is 400% or less; and the TD elongation percentage is 200% or less.

14 Claims, No Drawings

(56) References Cited

FOREIGN PATENT DOCUMENTS

| JP | 2014-105329 | | 6/2014 | |
|----|---|---|---|---|
| JP | 2014-214205 | | 11/2014 | |
| JP | 2015-091920 | | 5/2015 | |
| JP | 6466383 | | 2/2019 | |
| JP | 6466384 | | 2/2019 | |
| KR | 101012743 | * | 2/2011 | |
| WO | WO-2016052556 A1 | * | 4/2016 | ............... C09J 7/26 |

OTHER PUBLICATIONS

JISK6767 "Cellular plastics-Polyethylene-Methods of test," Oct. 20, 1999, pp. 1-21, with Machine Translation.

'Toray' Technical Data Polyethylene Foam TORAYPEF, pp. 1-3, 23, 50, 58, and 59, May 27, 1999, with English Translation.

"TORAYPEF" Technical Data (Polyethylene Foam) Toray Industries, Inc. October, Heisei 3 (1999), pp. 21 and 23, with English Translation.

Office Action dated Apr. 28, 2020 in corresponding Indian Patent Application No. 201817011314.

\* cited by examiner

POLYOLEFIN RESIN FOAMED SHEET AND ADHESIVE TAPE

TECHNICAL FIELD

The present invention relates to a polyolefin resin foam sheet and an adhesive tape comprising the same.

BACKGROUND ART

Conventionally, in various electronic equipment, some members such as a display device may be arranged on an impact-absorbing sheet such as a foam in order to prevent breakage. Further, since electronic components having high-performance and high integrated design generate a large amount of heat in electronic equipment, particularly in miniaturized electronic equipment, the heat may cause a user's low temperature burn, failure of equipment, and the like. Therefore, an impact-absorbing sheet may be required to have thermal insulation properties in addition to impact-absorbing properties in order to prevent heat transfer to other components and heat transfer to the surface of electronic equipment.

An impact-absorbing sheet is generally arranged in a narrow gap between an electronic component that is a heat-generating element, and a metal housing, and is required to be able to be easily arranged even in a narrow gap, therefore. Furthermore, it is required that a performance that can be in close contact with an uneven surface in the inside of equipment without a gap (step followability) should be excellent for an impact-absorbing sheet. Therefore, an impact-absorbing sheet is also required to have flexibility.

It has been considered that a polyolefin resin foam sheet is used as such an impact-absorbing sheet. Conventionally, a polyolefin resin foam sheet has been variously improved in order to improve various performances. For example, in Patent Document 1, it has been attempted to adjust the distance between cells in the thickness direction (average cell wall thickness) to 10 to 20 μm while keeping the expansion ratio at 1.3 to 2.3 cm$^3$/g, in order to increase mechanical strength in the thickness direction and secure good impact resistance performance.

CITATION LIST

Patent Literature

Patent Document 1: JP 2013-213104 A

SUMMARY OF INVENTION

Technical Problem

In recent years, performance improvement and high integration of various electronic components such as CPU and a camera module have progressed in electronic equipment used in the information technology field. Such electronic components generate a large amount of heat and may produce a place called a heat spot where the temperature is locally increased, and therefore, an impact-absorbing sheet is required to have a higher thermal insulation effect. Further, a reduction in thickness of electronic equipment has progressed in recent years, and an impact-absorbing sheet having a high thermal insulation effect is also required to be reduced in thickness.

However, it is difficult for a polyolefin resin foam sheet to develop sufficient thermal insulation performance when it is reduced in thickness, and further improvement in thermal insulation performance is required.

Further, electronic equipment used in the information technology field has been reduced in thickness while enlarging the area, which tends to easily cause glass cracks and the like in a part of members such as a display device. Further, a touch-sensitive type is often used in some display devices, particularly in a display device mounted on a smartphone, but such a display device tends to easily cause pooling in the screen operation. Therefore, a foam used in electronic equipment has been required to have higher flexibility and impact-absorbing properties in recent years.

However, in conventional polyolefin resin foam sheets, it is difficult to sufficiently improve flexibility and impact-absorbing properties while maintaining thermal insulation properties at a high level.

The present invention has been made in view of the above circumstances, and an object of the present invention is to provide a polyolefin resin foam sheet having high thermal insulation performance while maintaining the flexibility of the foam sheet.

Further, another object of the present invention is to provide a polyolefin resin foam sheet having improved flexibility in the thickness direction and impact-absorbing properties while keeping high thermal insulation properties.

Solution to Problem

As a result of extensive and intensive studies, the present inventors have found that, for a polyolefin resin foam sheet, when 50% compressive strength is as low as 120 kPa or less to result in high flexibility of the foam sheet, thermal insulation properties can be improved by setting elongation at break to a low level, and have completed the first aspect of the present invention. The first aspect of the present invention provides the following (1) and (3) to (11).

Further, as a result of extensive and intensive studies, the present inventors have also found that, in a polyolefin resin foam sheet, when the foam sheet is designed to have low elongation at break while keeping high thermal insulation properties, flexibility in the thickness direction and impact-absorbing properties can be increased while maintaining good thermal insulation properties, and have completed the second aspect of the present invention. The second aspect of the present invention provides the following (2) and (4) to (11).

(1) A polyolefin resin foam sheet having a plurality of cells in an inside thereof, the polyolefin resin foam sheet having the 50% compressive strength of 120 kPa or less; the MD elongation percentage of 400% or less; and the TD elongation percentage of 200% or less.

(2) A polyolefin resin foam sheet having a plurality of cells in an inside thereof, the polyolefin resin foam sheet having the thermal conductivity of 0.050 W/(m·K) or less; the MD elongation percentage of 400% or less; and the TD elongation percentage of 200% or less.

(3) The polyolefin resin foam sheet according to the above (1), wherein the thermal conductivity is 0.050 W/(m·K) or less.

(4) The polyolefin resin foam sheet according to any one the above (1) to (3), wherein the average distance between cells is 4.0 μm or less.

(5) The polyolefin resin foam sheet according to any one of the above (1) to (4), wherein the foam sheet is a cross-linked body.

(6) The polyolefin resin foam sheet according to the above (5), wherein the degree of crosslinking is 30% by mass or more and 60% by mass or less.
(7) The polyolefin resin foam sheet according to any one of the above (1) to (6), wherein the thickness is 0.02 mm or more and 0.45 mm or less.
(8) The polyolefin resin foam sheet according to any one of the above (1) to (7), wherein the apparent ratio is 9.0 cm$^3$/g or more and 24.0 cm$^3$/g or less.
(9) The polyolefin resin foam sheet according to any one of the above (1) to (8), wherein the closed-cell ratio is 70 to 100%.
(10) The polyolefin resin foam sheet according to any one of the above (1) to (9), wherein the foam sheet is a foam of a material comprising at least polyethylene resin.
(11) An adhesive tape comprising a polyolefin resin foam sheet according to any one of the above (1) to (10) and a pressure sensitive adhesive layer provided on at least one surface of the polyolefin resin foam sheet.

Advantageous Effects of Invention

According to the present invention, it is possible to improve the thermal insulation properties of a polyolefin resin foam sheet while maintaining the flexibility of the foam sheet. Further, the present invention provides a polyolefin resin foam sheet having high thermal insulation properties and good flexibility in the thickness direction and impact-absorbing properties.

DESCRIPTION OF EMBODIMENTS

Hereinafter, the present invention will be described further in detail using embodiments. Hereinafter, the first aspect of the present invention and the second aspect of the present invention described above will be described using a first and second embodiment, respectively.

First Embodiment

The polyolefin resin foam sheet according to the first embodiment is a foam having a plurality of cells in the inside thereof, wherein the 50% compressive strength is 120 kPa or less; the MD elongation percentage is 400% or less; and the TD elongation percentage is 200% or less. Note that, in the following description, the polyolefin resin foam sheet may simply be referred to as "foam sheet".

The 50% compressive strength of the polyolefin resin foam sheet according to the first embodiment is made to be 120 kPa or less by using a polyolefin resin as a resin component and by, for example, adjusting the apparent ratio (expansion ratio), the average distance between cells, and the like as will be described below. In such a foam sheet, thermal insulation properties in the thickness direction is improved by reducing the MD and TD elongation percentage.

On the other hand, if the foam sheet according to the first embodiment has a 50% compressive strength of higher than 120 kPa, the flexibility in the thickness direction of the foam sheet will decrease. As a result, high impact-absorbing properties cannot be easily obtained; step followability will decrease; or it will be difficult to arrange the foam sheet in a narrow gap. Further, in the foam sheet according to the first embodiment, even if the 50% compressive strength is 120 kPa or less, thermal insulation properties in the thickness direction may not be sufficiently high if the MD elongation percentage is higher than 400% or the TD elongation percentage is higher than 200%. The elongation percentage of the foam sheet can be brought into an elongation percentage in the above ranges by, for example, adjusting a resin used in the foam sheet, the apparent ratio (expansion ratio), the stretching ratio, and the like.

The foam sheet according to the first embodiment preferably has a 50% compressive strength of 50 kPa or more and 110 kPa or less, more preferably 70 kPa or more and 105 kPa or less, in view of improving flexibility and impact-absorbing properties.

The foam sheet according to the first embodiment preferably has an MD elongation percentage of 160% or more and 380% or less and a TD elongation percentage of 100% or more and 190% or less, more preferably an MD elongation percentage of 180% or more and 360% or less and a TD elongation percentage of 110% or more and 180% or less, in view of improving mechanical strength, flexibility, and thermal insulation properties with a good balance.

Note that, in the present invention, "MD" means Machine Direction, and it means a direction that is in agreement with the direction of extrusion or the like of a polyolefin resin foam sheet. Further, "TD" means Transverse Direction, and it means a direction that is orthogonal to MD and parallel to the foam sheet. Further, "ZD" means Thickness Direction and is a direction perpendicular to both MD and TD.

A foam sheet having a low 50% compressive strength of 120 kPa or less and a low elongation at break as described above will have low thermal conductivity. Specifically, the foam sheet according to the first embodiment preferably has a thermal conductivity of 0.050 W/(m·K) or less. The thermal conductivity of the foam sheet according to the first embodiment is more preferably 0.048 W/(m·K) or less in view of improving the thermal insulation properties of the foam sheet.

Further, the lower the thermal conductivity of the foam sheet, the higher the thermal insulation properties will be, but in order to practically produce the foam sheet, the thermal conductivity of the foam sheet is preferably 0.025 W/(m·K) or more, more preferably 0.030 W/(m·K) or more.

Although the thermal conductivity can be reduced by reducing the average distance between cells, the thermal conductivity can also be reduced by adjusting the average cell diameter or the like, as well as the average distance between cells.

Note that the thermal conductivity means the thermal conductivity in the thickness direction of a sheet, and it is specifically measured by the method described in Examples.

Second Embodiment

The foam sheet according to the second embodiment of the present invention is a foam sheet having an MD elongation percentage of a predetermined value or less while keeping high thermal insulation properties. Specifically, in the second embodiment, the foam sheet is a polyolefin resin foam sheet having a plurality of cells in the inside, wherein the thermal conductivity is 0.050 W/(m·K) or less; the MD elongation percentage is 400% or less; and the TD elongation percentage is 200% or less.

The foam sheet according to the second embodiment has good thermal insulation properties that is thermal conductivity of 0.050 W/(m·K) or less, for example, by reducing the average distance between cells as will be described below. In the second embodiment, even such a foam sheet having low thermal conductivity has high impact-absorbing properties and flexibility in the thickness direction in addition to thermal insulation properties by reducing the MD and TD elongation percentage. Although the principle of the above result is not clear, it is conceivable that when the elongation percentage is reduced, stress dispersibility against local stress can be improved by pulling surrounding structure therein. As a result, impact-absorbing properties and flexibility are presumed to be increased.

If thermal conductivity is higher than 0.050 W/(m·K) in the foam sheet according to the second embodiment, sufficient thermal insulation performance will not be able to be exhibited when a thin foam sheet is used in electronic equipment. The thermal conductivity of the foam sheet is preferably 0.048 W/(m·K) or less in view of improving the thermal insulation properties of the foam sheet.

Further, the lower the thermal conductivity of the foam sheet, the higher the thermal insulation properties will be, but in order to practically produce the foam sheet, the thermal conductivity of the foam sheet is preferably 0.025 W/(m·K) or more, more preferably 0.030 W/(m·K) or more.

Although the thermal conductivity can be reduced by reducing the average distance between cells, the thermal conductivity can also be reduced by adjusting the average cell diameter or the like, as well as the average distance between cells.

In the foam sheet according to the second embodiment, if the MD elongation percentage is higher than 400%, or if the TD elongation percentage is higher than 200%, it will be difficult to secure the flexibility in the thickness direction and impact-absorbing properties of the foam sheet. In order to secure high flexibility and impact-absorbing properties, it is preferred that the MD elongation percentage be 380% or less, and that the TD elongation percentage be 190% or less; and it is more preferred that the MD elongation percentage be 360% or less, and that the TD elongation percentage be 180% or less.

Further, in order to also increase mechanical strength while securing flexibility in the thickness direction and impact-absorbing properties, it is preferred that the MD elongation percentage be 160% or more, and that the TD elongation percentage be 100% or more; and it is more preferred that the MD elongation percentage be 180% or more, and that the TD elongation percentage be 110% or more.

The elongation percentage of the foam sheet according to the second embodiment can be brought into the above ranges by, for example, adjusting the resin used in the foam sheet, the apparent ratio (expansion ratio), the stretching ratio, or the like.

Hereinafter, the constitution of the foam sheets according to the above first and second embodiments other than the above will be described in detail.

<Tensile Strength>

The tensile strength of the foam sheet according to each embodiment is not particularly limited, but in view of increasing the mechanical strength and the like of the foam sheet, it is preferred that the tensile strength in MD be 1.6 to 7.0 MPa, and that the tensile strength in TD be 1.0 to 5.0 MPa; and it is more preferred that the tensile strength in MD be 1.8 to 5.0 MPa, and that the tensile strength in TD be 1.2 to 4.0 MPa.

Note that the elongation percentages and tensile strengths in MD and TD refer to the elongation percentage and the tensile strength at break when the foam sheet is elongated in MD and TD at 23° C., and are measured according to JIS K6767. Further, the 50% compressive strength of the foam sheet refers to a value measured according to JIS K6767.

<Average Distance Between Cells>

The foam sheet according to each embodiment preferably has an average distance between cells of 4.0 μm or less. The average distance between cells refers to an average value of the distance between cells along MD in a cross section parallel to MD and ZD and the distance between cells along TD in a cross section parallel to TD and ZD. The specific measuring method will be described in Examples.

In the foam sheet, when the average distance between cells is reduced as described above, the resistance in the thickness direction will be reduced; the 50% compressive strength will be easily reduced; and the flexibility will be easily increased. Further, since cell walls have high thermal conductivity compared with a gas in the cells, the cell walls tend to serve as a medium to conduct heat. Therefore, when average distance between cells (that is, thickness of cell walls) is reduced, the heat conduction by cell walls will be minimized, and the thermal conductivity in the thickness direction will be easily reduced. The average distance between cells is more preferably 3.5 μm or less in view of reducing 50% compressive strength and reducing thermal conductivity while increasing flexibility.

The average distance between cells in each embodiment is preferably 1.5 μm or more, more preferably 2.0 μm or more, in order to improve the mechanical strength, impact-absorbing properties, and the like of the foam sheet.

The average distance between cells can be brought into the above ranges by appropriately adjusting the degree of crosslinking of the foam sheet, the apparent ratio (expansion ratio) of the foam sheet, the stretching ratio in the production of the foam sheet, and the like, described below.

<Apparent Ratio>

The apparent ratio (expansion ratio) of the foam sheet according to each embodiment is preferably 9.0 cm$^3$/g or more and 24.0 cm$^3$/g or less, more preferably 10.0 cm$^3$/g or more and 20.0 cm$^3$/g or less. When the apparent ratio is equal to or more than these lower limits, the average distance between cells will be easily reduced while keeping low 50% compressive strength and keeping high flexibility and impact-absorbing properties. Furthermore, the MD and TD elongation percentage are easily reduced. On the other hand, when the apparent ratio is equal to or less than these upper limits, the mechanical strength and the like of the foam sheet will be easily improved. Furthermore, when the apparent ratio is within these ranges, the average cell diameter will be easily brought into the range to be described below. Note that the apparent ratio is a value obtained by measuring apparent density according to JIS K7222 and determining the reciprocal of the apparent density.

<Degree of Crosslinking (Gel Fraction)>

The foam sheet according to each embodiment is generally obtained by crosslinking, and the foam sheet is a crosslinked body. The degree of crosslinking (gel fraction) of the foam sheet is preferably 30% by mass or more and 60% by mass or less, more preferably 30% by mass or more and 45% by mass or less. When the degree of crosslinking is equal to or more than the lower limit, sufficient crosslink will be formed, and the average distance between cells will be easily reduced, combined with bringing the apparent ratio (expansion ratio) into the above lower limits or more. Further, when the degree of crosslinking is equal to or less than these upper limits, the flexibility, impact-absorbing properties, and the like of the foam sheet are easily secured. Furthermore, when the degree of crosslinking is within the above ranges, the MD and TD elongation percentage will be easily adjusted in desired ranges. Note that the degree of crosslinking is measured by the method described in Examples to be described below.

<Average Cell Diameter>

The average cell diameter in MD and TD in the foam sheet according to each embodiment is preferably 50 to 300 μm, more preferably 100 to 250 μm, in view of improving thermal insulation properties while bringing 50% compressive strength of the foam sheet into a desired range or while increasing flexibility and impact-absorbing properties. Note that the average cell diameter in MD and TD means an average value of the average cell diameter in MD and the average cell diameter in TD, and may be represented as (MD+TD)/2.

The average cell diameter in MD and TD is sufficiently larger than the average distance between cells, and is preferably 30 times or more, more preferably 40 times or more, and further preferably 50 to 150 times, based on the average distance between cells described above. Thus, when the average cell diameter is sufficiently large compared with the average distance between cells in MD and TD, the 50% compressive strength can be sufficiently reduced, and the flexibility of the foam sheet can be easily increased. Furthermore, the path of the heat conduction in the thickness direction will be restricted, and the thermal conductivity will be easily reduced.

The average cell diameter in ZD in the foam sheet according to each embodiment is preferably relatively small in view of improving thermal insulation properties, flexibility, and impact-absorbing properties, and is preferably 100 μm or less, more preferably 90 μm or less, and further preferably 20 to 80 μm. When the average cell diameter in ZD is equal to or less than the above upper limits, flexibility and impact-absorbing properties will be improved and the movement of air in the inside of the foam sheet is restricted so as to suppress the heat conduction by the air convection, thereby improving thermal insulation properties.

<Thickness>

The thickness of the foam sheet according to each embodiment is preferably 0.02 mm or more and 0.45 mm or less. As in the first embodiment, when 50% compressive strength and MD and TD elongation percentages are each equal to or less than the predetermined value, even such an ultrathin foam sheet will have good thermal insulation performance. Further, when the thickness of the foam sheet is within the above range, the flexibility and impact-absorbing properties of the foam sheet can be secured, and the foam sheet will be easily used in the inside of thin electronic equipment. The thickness of the foam sheet is more preferably 0.03 mm or more and 0.40 mm or less. When the foam sheet has such thickness, thermal insulation properties, flexibility, and impact-absorbing properties will be able to be improved with a good balance.

<Closed-Cell Ratio>

In the foam sheet according to each embodiment, the cells are preferably closed cells. "The cells being closed cells" means that the proportion of closed cells relative to all the cells (referred to as "closed-cell ratio") is 70% or more. When an impact is applied to cells, the deformation amount of the cells will be suppressed if the cells are closed cells. Thereby, the deformation amount of the foam sheet by the impact will be suppressed so as to more easily increase impact-absorbing properties.

In order to further improve impact-absorbing properties, the closed-cell ratio is preferably 70 to 100%, more preferably 80 to 100%, and further preferably 90 to 100%.

When the closed cell ratio is within these ranges, the movement of air in the inside of the foam sheet is restricted so as to suppress the heat conduction by air, thereby improving thermal insulation properties.

Note that the closed-cell ratio refers to that as measured according to ASTM D2856 (1998).

[Polyolefin Resin]

The foam sheet according to each embodiment is generally a foam of a material (polyolefin resin composition) containing at least polyolefin resin. Examples of the polyolefin resins used for forming a foam sheet include a polyethylene resin, a polypropylene resin, and mixtures thereof, and a polyethylene resin is preferred.

<Polyethylene Resin>

The polyethylene resin may be an ethylene homopolymer, but a polyethylene resin obtained by copolymerizing an ethylene and a small amount (for example, 30% by mass or less, preferably 10% by mass or less, of total monomers) of α-olefin as needed is preferred.

Specific examples of α-olefins constituting the polyethylene resin include propylene, 1-butene, 1-pentene, 4-methyl-1-pentene, 1-hexene, 1-heptene, and 1-octene. Among them, α-olefins having 4 to 10 carbon atoms are preferred.

The polyethylene resin has preferably the low density, and is more preferably a linear low density polyethylene, in order to reduce 50% compressive strength of a foam sheet and in order to increase flexibility to thereby increase impact-absorbing properties. Specifically, the density of such polyethylene resin is preferably 0.920 g/cm$^3$ or less, more preferably 0.880 to 0.915 g/cm$^3$, and further preferably 0.885 to 0.910 g/cm$^3$. Note that the density has been measured according to ASTM D792.

Further, an ethylene-vinylacetate copolymer is also preferred as a polyethylene resin. The ethylene-vinylacetate copolymer (EVA) is generally a copolymer containing 50% by mass or more of ethylene units. The ethylene-vinylacetate copolymer has a vinylacetate content of, for example, 5 to 50% by mass, preferably 10 to 40% by mass, more preferably 15 to 35% by mass. Note that the vinylacetate content has been measured according to JIS K6924-1.

<Polypropylene Resin>

Examples of the polypropylene resin include a propylene homopolymer and a propylene-α-olefin copolymer containing 50% by mass or more of propylene units. These may be used singly or in combination of two or more.

Specific examples of α-olefins constituting the propylene-α-olefin copolymer include ethylene, 1-butene, 1-pentene, 4-methyl-1-pentene, 1-hexene, 1-heptene, and 1-octene, and α-olefins having 6 to 12 carbon atoms are preferred among them.

A polyethylene resin or a polypropylene resin, polymerized using a metallocene compound, a Ziegler-Natta compound, a chromium oxide compound, or the like as a catalyst, or a mixture thereof, is preferred as a polyolefin resin, in view of reducing 50% compressive strength of a foam sheet to thereby improve flexibility and improving impact-absorbing properties. Among them, a polyethylene resin polymerized using a metallocene compound as a catalyst is preferred.

When a polyethylene resin obtained by using a metallocene compound as a catalyst is used, the content thereof is preferably 40% by mass or more, more preferably 50% by mass or more, further preferably 60% by mass or more, and further more preferably 100% by mass, of the total polyolefin resins.

In each embodiment, the elongation percentage is easily set to the range described above by using a polyethylene resin, particularly a linear low density polyethylene (LL- DPE), as the resin of a foam sheet. Further, when LLDPE is used, LLDPE may be used singly as a polyolefin resin or may be used, for example, in combination with another polyolefin resin, and EVA is preferred as the other polyolefin resin used in combination. LLDPE is preferably 20 to 100% by mass, more preferably 25 to 100% by mass, and further preferably 30 to 100% by mass, of the total polyolefin resins. In this case, LLDPE is preferably the one obtained by using a metallocene compound as a catalyst, also. On the other hand, EVA is preferably 90% by mass or less, more preferably 80% by mass or less, and further preferably 70% by mass or less, of the total polyolefin resins.

[Metallocene Compound]

Examples of the suitable metallocene compounds include a compound such as a bis(cyclopentadienyl)metal complex having a structure in which a transition metal is sandwiched by unsaturated compounds each having a π-electron system. More specific examples include a compound in which one or more cyclopentadienyl rings or analogs thereof are present as ligands on a tetravalent transition metal such as titanium, zirconium, nickel, palladium, hafnium, and platinum.

In such a metallocene compound, active sites have uniform properties, and each active site has the same degree of activity. A polymer synthesized using a metallocene compound has high uniformity in molecular weight, molecular weight distribution, composition, composition distribution, and the like. Therefore, when a sheet containing a polymer synthesized using a metallocene compound is crosslinked, the crosslinking proceeds uniformly. Since a uniformly crosslinked sheet is easily uniformly stretched, the thickness of the crosslinked polyolefin resin foam sheet can be easily made uniform.

Examples of the ligands include a cyclopentadienyl ring and an indenyl ring. These cyclic compounds may be substituted with a hydrocarbon group, a substituted hydrocarbon group, or a hydrocarbon-substituted metalloid group. Examples of the hydrocarbon group include a methyl group, an ethyl group, various propyl groups, various butyl groups, various amyl groups, various hexyl groups, a 2-ethylhexyl group, various heptyl groups, various octyl groups, various nonyl groups, various decyl groups, various cetyl groups, and a phenyl group. Note that "various" means various isomers including n-, sec-, tert-, and iso-.

Further, an oligomer obtained by polymerizing a cyclic compound may be used as a ligand.

Furthermore, a monovalent anion ligand such as chloride and bromide, a bivalent anion chelate ligand, hydrocarbon, alkoxide, arylamide, aryloxide, amide, arylamide, phosphide, arylphosphide, and the like may be used, other than the unsaturated compounds each having a π-electron system.

Examples of the metallocene compound containing a tetravalent transition metal and a ligand include cyclopentadienyltitanium tris(dimethylamide), methylcyclopentadienyltitanium tris(dimethylamide), bis(cyclopentadienyl)titanium dichloride, and dimethylsilyltetramethylcyclopentadienyl-t-butylamidezirconium dichloride.

A metallocene compound exhibits the action as a catalyst by using it in combination with a specific cocatalyst (promoter) when various olefins are polymerized. Specific examples of the cocatalyst include methyl aluminoxane (MAO) and a boron-based compound. The ratio of the molar amount of the cocatalyst to be used relative to that of the metallocene compound is preferably 10 to 1,000,000, more preferably 50 to 5,000.

<Ziegler-Natta Compound>

The Ziegler-Natta compound is a triethylaluminum-titanium tetrachloride solid composite, and is preferably produced by a method involving combining a titanium trichloride composition, an organoaluminum compound, and an aromatic carboxylate, the titanium trichloride composition obtained by reducing titanium tetrachloride with an organoaluminum compound and then treating with various electron donors and electron acceptors (refer to JP 56-100806 A, JP 56-120712 A, and JP 58-104907 A), a method involving using a supported catalyst in which titanium tetrachloride and various electron donors are brought into contact with a magnesium halide (refer to JP 57-63310 A, JP 63-43915 A, and JP 63-83116 A), or the like.

The foam sheet according to each embodiment may be formed by foaming a material consisting of a polyolefin resin alone but is generally formed by foaming a polyolefin resin composition containing various additive such as a thermally decomposable foaming agent to be described below and the other. Further, the foam sheet may be formed by foaming a polyolefin resin composition containing, in addition to a polyolefin resin, a rubber or resin component other than the polyolefin resin.

As for the rubber and resin components in the polyolefin resin composition, the polyolefin resin is the main component; and the content of the rubber and resin components other than the polyolefin resin is lower than that of the polyolefin resin, and is generally less than 50 parts by mass, preferably 30 parts by mass or less, based on 100 parts by mass of the polyolefin resin.

[Method for Producing Foam Sheet]

The method for producing the foam sheet described above is not limited, and the foam sheet can be produced by a common production method. Generally, the foam sheet is produced by crosslinking the polyolefin resin composition as needed followed by foaming.

Specifically, the foam sheet is produced, for example, by a method comprising the following steps (1) to (3):

Step (1): A step of obtaining a sheet-shaped polyolefin resin composition by feeding a polyolefin resin, a thermally decomposable foaming agent, and other additive to an extruder, melt-kneading these components, and extruding the melt-kneaded mixture from the extruder into a sheet shape;

Step (2): A step of crosslinking the sheet-shaped polyolefin resin composition; and Step (3): A step of heating the sheet-shaped crosslinked polyolefin resin composition to foam the thermally decomposable foaming agent and preferably stretching the sheet either in the MD or in the TD, or in both directions.

Furthermore, instead of the method described above, the crosslinked polyolefin resin foam sheet can also be produced by a method described in WO 2005/007731.

Examples of the thermally decomposable foaming agent include, but are not particularly limited to, azodicarbonamide, N,N'-dinitrosopentamethylenetetramine, and p-toluenesulfonyl semicarbazide. Among them, azodicarbonamide is preferred. The thermally decomposable foaming agent may be used singly or in combination of two or more.

The content of the thermally decomposable foaming agent in the polyolefin resin composition is preferably 1 to 23 parts by mass based on 100 parts by mass of the polyolefin resin. When the content of the thermally decomposable foaming agent is within the above range, the foamability of the polyolefin resin composition will be improved so that a polyolefin resin foam sheet having a desired expansion ratio can be easily obtained, and the elongation percentage and the like will be easily adjusted to a desired range. Further, the content of the above thermally decomposable foaming agent is more preferably 6 to 20 parts by mass based on 100 parts by mass of the polyolefin resin. When the content of the foaming agent is relatively increased in this way, the expansion ratio will be increased and the average distance between cells will be easily reduced.

Examples of other additive added to the polyolefin resin composition include a decomposition temperature regulator, a crosslinking auxiliary, and an antioxidant.

The decomposition temperature regulator is blended for reducing the decomposition temperature of the thermally decomposable foaming agent or increasing or controlling the decomposition rate, and examples of specific compounds thereof include zinc oxide, zinc stearate, and urea. The decomposition temperature regulator is blended, for example, in an amount of 0.01 to 5 parts by mass based on 100 parts by mass of the polyolefin resin, in order to adjust the surface state or the like of the foam sheet.

A polyfunctional monomer can be used as the crosslinking auxiliary. Addition of the crosslinking auxiliary to the polyolefin resin reduces the dose of ionizing radiation radiated in step (2) to thereby prevent the cutting and degradation of resin molecules caused by the irradiation with the ionizing radiation.

Specific examples of the crosslinking auxiliary include compounds having three functional groups in one molecule, such as trimethylolpropane trimethacrylate, trimethylolpropane triacrylate, triallyl trimellitate ester, triallyl 1,2,4-benzenetricarboxylate ester, and triallyl isocyanurate; compounds having two functional groups in one molecule, such as 1,6-hexanediol dimethacrylate, 1,9-nonaneciol dimethacrylate, 1,10-decanediol dimethacrylate, and divinylbenzene; diallyl phthalate, diallyl terephthalate, diallyl isophthalate, ethylvinylbenzene, neopentyl glycol dimethacrylate, lauryl methacrylate, and stearyl methacrylate. These crosslinking auxiliaries are used singly or in combination of two or more.

The amount of the crosslinking auxiliary added is preferably 0.2 to 10 parts by mass, more preferably 0.3 to 5 parts by mass, further preferably 0.5 to 5 parts by mass, based on 100 parts by mass of the polyolefin resins. When the amount of the crosslinking auxiliary added is 0.2 parts by mass or more, the foam sheet can stably obtain a desired degree of crosslinking, and when the amount of the crosslinking auxiliary added is 10 parts by mass or less, the control of the degree of crosslinking of the foam sheet will be easy.

Further, examples of the antioxidant include phenolic antioxidants, such as 2,6-di-t-butyl-p-cresol.

Examples of the methods of foaming the polyolefin resin composition include, but are not particularly limited to, a method including heating the polyolefin resin composition with hot air, a method including heating it with infrared rays, a method including heating it with a salt bath, and a method including heating it with an oil bath. These methods may be used in combination.

Furthermore, the foaming of the polyolefin resin composition is not limited to the case of using a thermally decomposable foaming agent, and physical expansion with butane gas or the like may be used.

Example of the method of crosslinking the polyolefin resin composition include a method including blending an organic peroxide with the polyolefin resin composition in advance and heating the polyolefin resin composition to decompose the organic peroxide.

Examples of the organic peroxide used for crosslinking include 1,1-bis(t-butylperoxy)3,3,5-trimethylcyclohexane and 1,1-bis(t-butylperoxy)cyclohexane. These may be used singly or in combination of two or more. The amount of the organic peroxide added is preferably 0.01 to 5 parts by mass, more preferably 0.1 to 3 parts by mass, based on 100 parts by mass of the polyolefin resin. When the amount of the organic peroxide added is within the above ranges, the crosslinking of the polyolefin resin composition will easily proceed, and the amount of the decomposed residue of the organic peroxide remaining in the foam sheet will be suppressed.

Further, examples of the method for crosslinking the polyolefin resin composition also include a method including irradiating the polyolefin resin composition with ionizing radiation, such as electron beams, α-rays, β-rays, and prays.

The dose of ionizing radiation is preferably 0.5 to 20 Mrad, more preferably 3 to 15 Mrad, so that the degree of crosslinking may be brought into the desired range described above.

These methods of crosslinking the polyolefin resin composition may be used singly or in combination, but the method including irradiating the resin composition with ionizing radiation is preferred in view of performing homogeneous crosslinking.

The polyolefin resin foam sheet is preferably stretched ether in MD or in TD, or in both TD and MD as described above. When the polyolefin resin foam sheet is stretched either in MD or in TD, or in both TD and MD, the average distance between cells will be easily brought into the desired range described above. Further, the average cell diameter in ZD will become relatively small compared with the average cell diameters in MD and TD, and the distance of the resin part through which heat conducts will be increased. As a result, thermal conductivity will be easily reduced.

The stretching may be performed after the polyolefin resin composition is foamed or may be performed while foaming the polyolefin resin composition. When a foam sheet is stretched after the polyolefin resin composition is foamed to obtain the foam sheet, it is preferred that the foam sheet be stretched consecutively without cooling the foam sheet while maintaining the molten state during the foaming. However, the foam sheet may be stretched, after the foam sheet is cooled and then heated again to a melted or a softened state.

The stretching ratio in MD of the foam sheet is preferably 1.1 to 5.0, more preferably 1.5 to 4.8. Further, the foam sheet is preferably also stretched in TD at a stretching ratio within the above ranges.

When the stretching ratios in MD and TD of the foam sheet are set within the above ranges, the average distance between cells will be easily set to a desired value. Further, when the stretching ratio is set to the above lower limits or more, the thermal insulation properties, flexibility, and tensile strength of the foam sheet will be easily improved.

On the other hand, when the stretching ratio is set to the above upper limits or less, the foam sheet will be prevented from breaking during stretching and reducing the expansion ratio by the escape of foaming gas from the foam sheet during foaming, the flexibility and tensile strength of the foam sheet will be improved, and the quality will also be easily uniform.

[Adhesive Tape]

The adhesive tape of the present invention is an adhesive tape in which the foam sheet described above is used as a base material, and specifically comprises a foam sheet and a pressure sensitive adhesive layer provided on one surface or both surfaces of the foam sheet. The adhesive tape has a thickness of generally 0.03 to 1.00 mm, preferably 0.05 to 0.80 mm.

The pressure sensitive adhesive layer constituting the adhesive tape preferably has a thickness of 5 to 200 μm, more preferably 7 to 150 μm, further preferably 10 to 100 μm. When the pressure sensitive adhesive layer constituting the adhesive tape has a thickness of 5 to 200 μm, the thickness of the adhesive tape is reduced to contribute miniaturization and reduction in thickness of electronic equipment in which the adhesive tape is used.

Examples of the pressure sensitive adhesive constituting the above pressure sensitive adhesive layer include, but are not particularly limited to, an acrylic pressure sensitive adhesive, a urethane pressure sensitive adhesive, a rubber pressure sensitive adhesive, and a silicone pressure sensitive adhesive.

Examples of the method of applying a pressure sensitive adhesive to a foam sheet so as to laminate a pressure sensitive adhesive layer to the foam sheet include a method including applying a pressure sensitive adhesive to at least one surface of a foam sheet using a coating machine such as a coater, a method including spraying or applying a pressure sensitive adhesive to at least one surface of a foam sheet using a sprayer, and a method including applying a pressure sensitive adhesive to one surface of a foam sheet using a brush.

[Method of Using Polyolefin Resin Foam Sheet]

The foam sheet or adhesive tape of each embodiment is used as a heat insulating material for insulating between a heat-generating member, such as a power source and CPU provided in the inside of an electronic equipment, for example, a mobile phone such as a smartphone, a video camera, or the like, and another member or a surface of the equipment. Since the foam sheet or adhesive tape of the present invention has high thermal insulation properties, a sufficient thermal insulation effect is exhibited even if it is thin. Furthermore, since the foam sheet or adhesive tape has low flexibility, it can be easily arranged in a narrow gap, and step followability is also improved.

Further, the foam sheet or adhesive tape of the present invention may be used as an impact absorber which prevents an impact from being applied to an electronic component provided in the body of electronic equipment or as a sealing material which prevents dust, water, and the like from entering the body of electronic equipment. Among them, the foam sheet or adhesive tape is preferably used as an impact absorber. Also in this case, the foam sheet or adhesive tape is used also as a heat insulating material.

Furthermore, the foam sheet or adhesive tape, particularly the foam sheet or adhesive tape according to the second embodiment, is more preferably arranged at the back side of a display device, particularly a touch-sensitive display device, and used as an impact absorber for absorbing the impact acting on the display device. The foam sheet or adhesive tape arranged in this way prevents glass cracks and the like of a display device and can also reduce polling occurring in a display device.

EXAMPLES

The present invention will be described further in detail with Examples, but the present invention is not limited at all by these Examples.

[Measuring Methods]

The measuring method of each physical property in the present specification is as follows.

<Apparent Ratio>

The apparent density of the foam sheets obtained in Examples and Comparative Examples was measured according to JIS K7222, and the reciprocal of the apparent density was defined as apparent ratio.

<Degree of Crosslinking (Gel Fraction)>

A test piece weighing about 50 mg is taken from a foam sheet obtained in Examples and Comparative Examples and precisely weighed to obtain the weight A (mg) of the test piece. Next, the test piece is immersed in 30 cm$^3$ of xylene at 105° C., allowed to stand for 24 hours, and then filtered through a 200-mesh wire net to collect insoluble matter on the wire net. The insoluble matter is vacuum dried and precisely weighed to obtain the weight B (mg) of the insoluble matter. From the obtained values, the degree of crosslinking (% by mass) is calculated by the following formula.

$$\text{Gel fraction(\% by mass)}=100\times(B/A)$$

<Closed-Cell Ratio>

The closed-cell ratio was measured according to ASTM D2856 (1998).

<50% Compressive Strength>

The 50% compressive strength was obtained by measuring a foam sheet according to JIS K6767.

<Average Cell Diameter>

A foam sample for measurement was cut into a 50-mm square, immersed in liquid nitrogen for 1 minute, and then cut with a razor along a surface parallel to MD and ZD. Subsequently, a photograph at a magnification of 200 was taken using a digital microscope (product name VHX-900, manufactured by Keyence Corporation) and measured for the cell diameters in MD and ZD of all the cells present in the cut surface for a length of 2 mm in MD. The operation was repeated 5 times, and the average value of all the cell diameters in MD was defined as the average cell diameter in MD.

A photograph at a magnification of 200 was taken in the same manner as above except that the foam sample was cut along a surface parallel to TD and ZD, and measured for the cell diameters in TD of all the cells present in the cut surface for a length of 2 mm in TD. The operation was repeated 5 times. Then, the average value of all the cell diameters in TD was defined as the average cell diameter in TD.

Regarding the average cell diameter in ZD, the average value of all the cell diameters in ZD in the total ten cross sections was defined as the average cell diameter in ZD.

<Average Distance Between Cells>

Further, in a photograph at a magnification of 1000 of a cut cross section cut along a surface along MD and ZD obtained in the same manner as in the measurement of the average cell diameter, the three shortest distances between cells adjacent to each other along MD are measured. The same operation is repeated 5 times, and the average value of the total 15 points is defined as the distance between cells in MD. In the same manner, in a photograph at a magnification of 1000 of a cut surface cut along a surface along TD and ZD, the three shortest distances between cells adjacent to each other along TD are measured. The same operation is repeated 5 times, and the average value of the total 15 points is defined as the distance between cells in TD. Then, the average value of the distance between cells in MD and the distance between cells in TD was defined as the average distance between cells.

<Elongation Percentage and Tensile Strength>

A foam sheet was cut into a shape of the dumbbell No. 1 specified in JIS K6251 4.1. This was used as a sample and was measured for the elongation percentages and tensile strengths in MD and TD at a measurement temperature of 23° C. according to JIS K6767.

<Thermal Conductivity>

A test piece was prepared by cutting a cylinder having a diameter of 40 mm from a foam sheet. The thermal conductivity of the test piece was measured using a physical properties measuring apparatus according to hot disc method ("TPS" manufactured by Kyoto Electronics Manufacturing Co., Ltd.).

Example 1

One hundred parts by mass of a linear low density polyethylene ("Kernel KF370" manufactured by Japan Polyethylene Corporation, density: 0.905 g/cm$^3$, melting point (DSC method) Tm: 97° C.) as a polyolefin resin, 10 parts by mass of azodicarbonamide as a thermally decomposable foaming agent, 1.0 part by mass of zinc oxide as a decomposition temperature regulator, and 0.5 part by mass of 2,6-di-t-butyl-p-cresol as an antioxidant were fed to an extruder, melt-kneaded at 130° C., and extruded as a continuous sheet of a polyolefin resin composition having a thickness of about 0.3 mm.

Next, the both surfaces of the above continuous sheet of the polyolefin resin composition were irradiated with 5.0 Mrad of electron beams at an acceleration voltage of 500 kV to crosslink the polyolefin resin composition. Then, the resulting sheet of the crosslinked polyolefin resin composition was continuously sent into a blowing oven maintained at 250° C. with hot wind and an infrared heater to be heated and foamed. While foaming the sheet of the crosslinked polyolefin resin composition, the sheet was stretched at an MD stretching ratio of 3.0 and a TD stretching ratio of 2.0 to thereby obtain a foam sheet having a thickness of 0.22 mm. The evaluation results of the resulting foam sheets are shown in Table 1.

Example 2

Example 2 was performed in the same manner as in Example 1 except that the amount of the thermally decomposable foaming agent blended was changed to 14 parts by mass, and that the stretching ratios in MD and TD were changed to 2.5 and 1.5, respectively.

Example 3

Example 3 was performed in the same manner as in Example 2 except that the amount of the linear low density polyethylene blended was changed to 30 parts by mass, and that 70 parts by mass of an ethylene-vinyl acetate copolymer ("Ultracen 636" manufactured by Tosoh Corporation, vinylacetate content: 19% by mass) was further blended as a polyolefin resin.

Example 4

Example 4 was performed in the same manner as in Example 1 except that the amount of the linear low density polyethylene blended was changed to 30 parts by mass, and that 70 parts by mass of an ethylene-vinyl acetate copolymer ("Ultracen 636" manufactured by Tosoh Corporation, vinylacetate content: 19% by mass) was further blended as a polyolefin resin.

Comparative Example 1

Comparative Example 1 was performed in the same manner as in Example 1 except that the amount of the thermally decomposable foaming agent blended was changed to 4 parts by mass; the dose of electron beams was changed to 4.5 Mrad; and the stretching ratios in MD and TD were changed to 2.0 and 1.5, respectively.

Comparative Example 2

Comparative Example 2 was performed in the same manner as in Example 1 except that the amount of the thermally decomposable foaming agent blended was changed to 4 parts by mass; the dose of electron beams was changed to 4.5 Mrad; and the stretching ratios in MD and TD were changed to 1.8 and 1.2, respectively.

Comparative Example 3

Comparative Example 3 was performed in the same manner as in Example 1 except that the amount of the thermally decomposable foaming agent blended was changed to 6 parts by mass; the dose of electron beams was changed to 4.5 Mrad; and the stretching ratios in MD and TD were changed to 2.0 and 1.5, respectively.

TABLE 1

| | | | Example | | | | Comparative Example | | |
|---|---|---|---|---|---|---|---|---|---|
| | | | 1 | 2 | 3 | 4 | 1 | 2 | 3 |
| Composition | Polyolefin resin (LLDPE) | | 100 | 100 | 30 | 30 | 100 | 100 | 100 |
| | Polyolefin resin (EVA) | | 0 | 0 | 70 | 70 | 0 | 0 | 0 |
| | Additives [parts by mass] | Thermally decomposable foaming agent | 10 | 14 | 14 | 10 | 4 | 4 | 6 |
| | | Decomposition temperature regulator | 1 | 1 | 1 | 1 | 1 | 1 | 1 |
| | | Antioxidant | 0.5 | 0.5 | 0.5 | 0.5 | 0.5 | 0.5 | 0.5 |
| Foam sheet | Thickness [mm] | | 0.22 | 0.37 | 0.25 | 0.30 | 0.21 | 0.32 | 0.36 |
| | Apparent density [g/cm$^3$] | | 0.08 | 0.06 | 0.06 | 0.08 | 0.19 | 0.19 | 0.12 |
| | Apparent ratio [cm$^3$/g] | | 12.0 | 16.8 | 16.5 | 12.5 | 5.4 | 5.2 | 8.4 |
| | Degree of crosslinking [%] | | 34 | 35 | 34 | 34 | 23 | 24 | 26 |
| | Closed-cell ratio [%] | | 90 | 90 | 90 | 90 | 95 | 95 | 95 |
| | 50% compressive strength [kPa] | | 96 | 95 | 96 | 101 | 206 | 258 | 135 |

TABLE 1-continued

|  |  | Example | | | | Comparative Example | | |
| --- | --- | --- | --- | --- | --- | --- | --- | --- |
|  |  | 1 | 2 | 3 | 4 | 1 | 2 | 3 |
| Average distance between cells [μm] | | 3.0 | 2.5 | 2.5 | 3.0 | 6.5 | 9.0 | 4.5 |
| Average cell diameter | MD | 170 | 190 | 180 | 180 | 150 | 160 | 170 |
| [μm] | TD | 230 | 250 | 245 | 240 | 200 | 170 | 250 |
|  | (MD + TD/2) | 200 | 220 | 213 | 210 | 175 | 165 | 210 |
|  | ZD | 54 | 57 | 60 | 58 | 46 | 62 | 52 |
| 23° C. elongation | MD | 350 | 340 | 320 | 335 | 470 | 490 | 480 |
| percentage [%] | TD | 130 | 130 | 130 | 135 | 250 | 400 | 220 |
| 23° C. tensile strength | MD | 2.9 | 2.0 | 1.9 | 2.7 | 4.7 | 4.8 | 3.0 |
| [MPa] | TD | 1.8 | 1.4 | 1.2 | 1.4 | 3.5 | 3.4 | 2.1 |
| Thermal conductivity [W/m · K] | | 0.047 | 0.044 | 0.047 | 0.048 | 0.065 | 0.067 | 0.056 |

As described above, in Examples 1 to 4, the MD elongation percentage at 23° C. was 400% or less, and the TD elongation percentage at 23° C. was 200% or less, in the polyolefin resin foam sheets each having a 50% compressive strength of 120 kPa or less. Thereby, the foam sheet had a low thermal conductivity value and had good thermal insulation properties in the thickness direction while keeping good flexibility. On the other hand, in Comparative Examples 1 to 3, since at least any one of the 50% compressive strength and the elongation percentages was a high value in the polyolefin resin foam sheets, it was impossible to improve thermal insulation properties while keeping good flexibility.

The invention claimed is:

1. A polyolefin resin foam sheet having a plurality of cells in an inside thereof,
   the polyolefin resin foam sheet having the 50% compressive strength of 120 kPa or less; the MD elongation percentage of 400% or less; and the TD elongation percentage of 200% or less,
   wherein the apparent ratio of the polyolefin resin foam sheet is 9.0 cm$^3$/g or more and 24.0 cm$^3$/g or less,
   wherein the polyolefin resin foam sheet has an average cell diameter in ZD of 80 μm or less,
   wherein the polyolefin resin foam sheet has an average cell diameter in MD and TD of 100 to 250 μm, and
   wherein the polyolefin resin foam sheet is a foam of a material comprising a linear low density polyethylene.

2. The polyolefin resin foam sheet according to claim 1, wherein the average distance between cells is 4.0 μm or less.

3. The polyolefin resin foam sheet according to claim 1, wherein the thickness is 0.02 mm or more and 0.45 mm or less.

4. The polyolefin resin foam sheet according to claim 1, wherein the closed-cell ratio is 70 to 100%.

5. An adhesive tape comprising the polyolefin resin foam sheet according to claim 1 and a pressure sensitive adhesive layer provided on at least one surface of the polyolefin resin foam sheet.

6. The polyolefin resin foam sheet according to claim 1, wherein the polyolefin resin foam sheet is a crosslinked body.

7. The polyolefin resin foam sheet according to claim 6, wherein the degree of crosslinking is 30% by mass or more and 60% by mass or less.

8. A polyolefin resin foam sheet having a plurality of cells in an inside thereof,
   the polyolefin resin foam sheet having the thermal conductivity of 0.050 W/(m·K) or less; the MD elongation percentage of 400% or less; and the TD elongation percentage of 200% or less,
   wherein the apparent ratio of the polyolefin resin foam sheet is 9.0 cm$^3$/g or more and 24.0 cm$^3$/g or less,
   wherein the polyolefin resin foam sheet has an average cell diameter in ZD of 80 μm or less,
   wherein the polyolefin resin foam sheet has an average cell diameter in MD and TD of 100 to 250 μm, and
   wherein the polyolefin resin foam sheet is a foam of a material comprising a linear low density polyethylene.

9. The polyolefin resin foam sheet according to claim 8, wherein the average distance between cells is 4.0 μm or less.

10. The polyolefin resin foam sheet according to claim 8, wherein the thickness is 0.02 mm or more and 0.45 mm or less.

11. The polyolefin resin foam sheet according to claim 8, wherein the closed-cell ratio is 70 to 100%.

12. An adhesive tape comprising the polyolefin resin foam sheet according to claim 8 and a pressure sensitive adhesive layer provided on at least one surface of the polyolefin resin foam sheet.

13. The polyolefin resin foam sheet according to claim 8, wherein the polyolefin resin foam sheet is a crosslinked body.

14. The polyolefin resin foam sheet according to claim 13, wherein the degree of crosslinking is 30% by mass or more and 60% by mass or less.

* * * * *